United States Patent
Cato (10) Patent No.: US 7,088,057 B2
(45) Date of Patent: Aug. 8, 2006

(54) APPARATUS, SYSTEM, AND METHOD FOR INDUCING AN ELECTRICAL CURRENT FOR USE BY AN ELECTRONIC DEVICE

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/939,682

(22) Filed: Sep. 13, 2004

(65) Prior Publication Data

US 2006/0055332 A1    Mar. 16, 2006

(51) Int. Cl.
*H05B 41/16* (2006.01)

(52) U.S. Cl. .......................... 315/248; 315/41
(58) Field of Classification Search ................ 315/248, 315/57, 62, 70, 41, 241
See application file for complete search history.

(56) References Cited

U.S. PATENT DOCUMENTS

| | | | | | |
|---|---|---|---|---|---|
| 2,352,231 | A | * | 6/1944 | Stratton | 327/331 |
| 2,624,858 | A | * | 1/1953 | Greenlee | 313/607 |
| 3,693,044 | A | * | 9/1972 | Gilman et al. | 315/57 |
| 3,742,281 | A | * | 6/1973 | McInally | 313/570 |
| 4,140,932 | A | * | 2/1979 | Wohlert | 310/15 |
| 4,982,140 | A | * | 1/1991 | Witting | 315/248 |
| 5,515,259 | A | * | 5/1996 | Stephenson | 363/59 |
| 5,594,304 | A | * | 1/1997 | Graber | 315/85 |
| 6,124,680 | A | * | 9/2000 | Shoji et al. | 315/291 |
| 6,292,744 | B1 | | 9/2001 | Want et al. | 701/207 |
| 6,597,118 | B1 | * | 7/2003 | Arimoto et al. | 315/115 |
| 2002/0167282 | A1 | * | 11/2002 | Kirkpatrick et al. | 315/248 |
| 2003/0062851 | A1 | * | 4/2003 | Shaffer | 315/248 |

FOREIGN PATENT DOCUMENTS

JP    64-047222    2/1989

OTHER PUBLICATIONS

Tom Harris, "How Fluorescent Lamps work", http://home.howstuffworks.com/fluorescent-lamp4.htm, no month, year.
"Fluorescent Light Generator?", www.physicsforums.com/archive/topics/10024, no months, years.
Marty Goodman, "History of Electric Lighting Technology", Jun. 1996, http://www.sheldonbrown.com/marty_light_hist.html.

* cited by examiner

*Primary Examiner*—Wilson Lee
*Assistant Examiner*—Hung Tran Vy
(74) *Attorney, Agent, or Firm*—Kunzler & Associates (57) ABSTRACT

An apparatus, system, and method are disclosed for inducing an electrical current for use by an electronic device. The apparatus includes an inductor and an interface coupling the inductor to an electronic device. The inductor comprises a continuous wire looped spirally, the inductor deriving power from an insulated conductor positioned within the bore of the inductor. The electronic device is substantially wholly energized by the power induced within the inductor. The system includes a non-conductive tube, an arc lamp tube, a light fixture, an inductor, and an interface. The inductor comprises a continuous wire wound spirally around the non-conductive tube, the inductor deriving inductor and is mounted in the light fixture. The light fixture powers the arc lamp tube. The interface couples the inductor to an electronic device.

28 Claims, 4 Drawing Sheets

APPARATUS, SYSTEM, AND METHOD FOR INDUCING AN ELECTRICAL CURRENT FOR USE BY AN ELECTRONIC DEVICE

BACKGROUND OF THE INVENTION

1. Field of the Invention

This invention relates to power supplies. Specifically, the invention relates to apparatus, systems, and methods for inducing power from an insulated conductor to power an electronic device.

2. Description of the Related Art

Computer technology is highly sophisticated and advances at an aggressive pace. Many desirable applications require technology that is well understood and readily available. Despite being technically feasible, designing and building a system to implement a particular desired application may not be financially practical.

For example, the ability to provide location-based information, such as an advertisement, to a retail shopper based on the location of the shopper within a retail store is a desirable application for retail store owners. Designing a system to provide the location-based information using existing technology is relatively straightforward. Such a system could include infrared (IR) beacons located in the ceiling of the retail store and a small display installed on each shopping cart.

The small display could determine its position within the retail store based on IR signals transmitted by the IR beacons. Based on the location of the shopping cart, the small display could provide helpful information or a targeted advertisement for the shopper. Generally, it would be desirable to have high location granularity. A large number of IR beacons would be desirable since the location granularity of the system increases as the number of IR beacons deployed increases.

The IR beacon system described above is technically feasible, but may be financially impractical. Installing a large number of IR beacons on the ceiling of a retail store can be expensive, particularly when installing the system in existing stores. Each IR beacon requires a power supply. Typically, there are no electrical outlets installed in retail store ceilings from which the IR beacons can obtain power.

A contractor could install electrical outlets near each desired IR beacon location. However, installing electrical outlets in an existing ceiling is expensive since the installation would involve extensive retrofitting of the electrical facilities of the ceiling. Similarly, a contractor could install hard-wired electric circuits for each IR beacon. Unfortunately, hard-wired electric circuits are also expensive to install for the same reasons as electrical outlets.

Alternatively, the system could use battery powered IR beacons. Battery powered IR beacons would minimize the need for expensive electrical wiring. However, a maintenance worker would need to regularly replace the batteries in the IR beacons. The labor and material expense of changing batteries limits the financial practicality of such a system.

Accordingly, what is needed is a power supply that is easy to install, requires little maintenance, and derives power from existing sources. The power supply would provide enough current for low-power electronic devices (such as an IR beacon) without requiring power from an electrical outlet or hard-wired electric circuit.

From the foregoing discussion, it should be apparent that a need exists for an apparatus, system, and method that induces an electrical current from a conductor for use by an electronic device. Beneficially, such an apparatus, system, and method would minimize installation expense when installing an electronic device in an existing building.

SUMMARY OF THE INVENTION

The present invention has been developed in response to the present state of the art, and in particular, in response to the problems and needs in the art that have not yet been fully solved by currently available power supplies. Accordingly, the present invention has been developed to provide an apparatus, system, and method for inducing an electrical current for use by an electronic device that overcome many or all of the above-discussed shortcomings in the art.

An apparatus according to one embodiment of the present invention includes an inductor and an interface. The interface couples the inductor to an electronic device. The inductor comprises a continuous wire looped spirally, the inductor deriving power from an insulated conductor positioned within the bore of the inductor.

In one embodiment, the continuous wire is insulated and forms an inductor with a bore diameter between about 0.5 inches and about 2 inches. Preferably, the insulated conductor carries an alternating current with a frequency above about one kilohertz. The insulated conductor may comprise an arc lamp tube, such as a fluorescent lamp tube, mercury vapor lamp tube, sodium lamp tube, or metal halide lamp tube. The insulated conductor may also comprise an incandescent light bulb or insulated wire. In one embodiment, the power derived by the inductor is between about one milliwatt and about ten milliwatts.

The electronic device may comprise an infrared beacon, radio frequency beacon, or other low-power electronic device. The electronic device is substantially wholly energized by the power induced within the inductor.

An apparatus according to another embodiment of the present invention includes a non-conductive tube, an inductor, and an interface. The inductor comprises a continuous wire, wound spirally around the non-conductive tube, the inductor derives power from an insulated conductor positioned within the bore of the inductor.

A system according to one embodiment of the present invention includes a non-conductive tube, an arc lamp tube, a light fixture, an inductor, and an interface coupling the inductor to an electronic device. The inductor comprises a continuous wire, wound spirally around the non-conductive tube. The inductor derives power from the arc lamp tube. The arc lamp tube is positioned within the bore of the inductor and is mounted in the light fixture. The light fixture powers the arc lamp tube.

A method of the present invention is also presented for inducing an electrical current for use by an electronic device. The method in the disclosed embodiments substantially includes the steps necessary to carry out the functions presented above with respect to the operation of the described apparatus and system. In one embodiment, the method includes providing a power supply comprising an inductor and an interface.

The power supply derives power from an arc lamp tube positioned within the bore of the inductor. The interface couples the inductor to an electronic device. An arc lamp tube is removed from a light fixture. The power supply is slid over the arc lamp tube such that the arc lamp tube passes axially through the bore of the inductor. An electronic device is coupled to the interface. The arc lamp tube passing through the bore of the inductor of the power supply is installed in the fixture.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
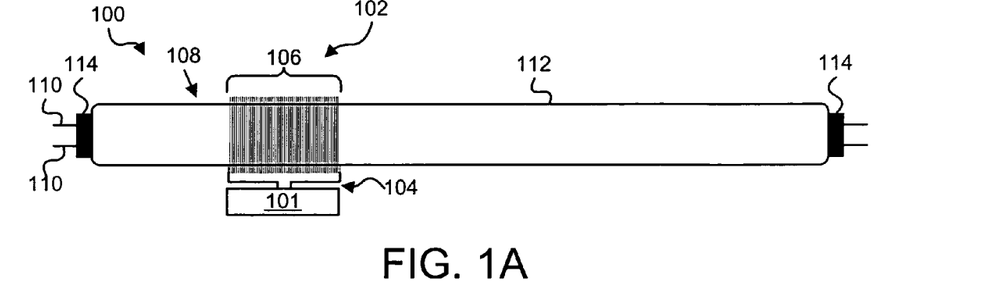
FIG. 1A is a front view of one embodiment of an apparatus for inducing an electrical current for use by an electronic device.

FIG. 1A illustrates an apparatus 100 for inducing an electrical current for use by an electronic device 101. The apparatus 100 includes an inductor 102 and an interface 104. The inductor 102 comprises a continuous wire looped spirally forming a tube with a predetermined diameter. The continuous wire may comprise a single wire, or may comprise multiple wires joined together so that the resulting wire is continuous. The loops 106 of the inductor 102 are arranged spirally, in a helical shape, extending laterally from one end of the inductor 102 to the other end of the inductor 102.

The inductor 102 may comprise loops 106 of non-insulated wire spaced so that the loops 106 do not make physical contact with each other. Preferably, the inductor 102 comprises loops 106 of insulated wire. The insulated wire loops 106 may be placed in contact with each other. The loops 106 of the inductor 102 form a tube. The loops 106 may comprise stiff wire formed in a tube shape. Alternatively, the loops 106 may comprise flexible wire that is held in a tube shape with glue, resin, a plastic casing, or the like.

An insulated conductor 108 is positioned within the bore of the inductor 102. The insulated conductor 108 induces an electrical current in the inductor 102. The insulated conductor 108 may comprise an arc lamp tube. The arc lamp tube may comprise a fluorescent lamp tube, mercury vapor lamp tube, sodium lamp tube, or metal halide lamp tube. The arc lamp tube produces light by passing an electrical arc through a gas plasma contained by the arc lamp tube. The electrical arc conducts electricity from one end of the arc lamp tube to the other end of the arc lamp tube.

The arc lamp tube includes pins 110, a glass tube 112, and collars 114. The pins 110 selectively attach the arc lamp tube to a light fixture and conduct electricity from the light fixture to the gas plasma. The glass tube 112 may contain the gas plasma and function as an insulator by preventing the electrical arc passing through the gas plasma from making contact with conductive elements outside the tube. The collars 114 may terminate the glass tube 112 and seal the ends of the tube to contain the gas plasma. The collars 114 may also provide a mounting point for the pins 110.

The insulated conductor 108 may also comprise an incandescent light bulb. The incandescent light bulb produces light by passing an electrical current through a filament. The incandescent light bulb is one example of an insulated conductor 108. The incandescent light bulb conducts electricity through the filament and includes a glass tube or bulb that insulates the current passing through the filament from contact with conductive elements outside the tube or bulb. The insulated conductor 108 may also comprise an insulated wire. The insulated wire comprises at least one metallic conductor and an insulating covering such as a plastic jacket.

A changing current in the insulated conductor 108 creates a circular magnetic field surrounding the insulated conductor 108. The circular magnetic field induces a current in the inductor 102. Preferably, the current is an alternating current with a frequency above about one kilohertz. If the insulated conductor 108 is an arc lamp tube, the changing current comprises the electrical arc that passes through the gas plasma contained within the glass tube 112. If the insulated conductor 108 is an incandescent light bulb, the changing current comprises a current passing through the filament of the incandescent light bulb.

The interface 104 couples the inductor 102 to an electronic device 101. The interface 104 may comprise bare wires that are soldered to the electronic device 101, a connector, printed circuit board traces, a wiring harness, or the like. Such interfaces 104 are well known to those of skill in the art. The interface 104 provides an electrical connection between the inductor 102 and the electronic device 101. The inductor 102 may provide current to the electronic device 101 through the electrical connection. The interface 104 may also provide a mechanical connection between the inductor 102 and the electronic device 101. The mechanical connection may hold the electronic device 101 in place and prevent damage or strain on the inductor 102.

The interface 104 may enable a maintenance worker to replace or service the electronic device 101 by removing the electronic device 101 from the inductor 102. The interface 104 may enable the maintenance worker to disconnect the electronic device 101 without removing the insulated conductor 108 from the bore of the inductor 102.

The insulated conductor 108 induces a current in the inductor 102 and creates an associated voltage and power in the inductor 102. The inductor 102 provides the power to the electronic device 101. The power induced within the inductor 102 substantially wholly energizes the electronic device 101. In one embodiment of the apparatus 100, the electronic device 101 does not rely on power from a wired power supply or battery. Instead, the electronic device 101 operates solely using the power provided by the inductor 102.

Certain embodiments of the electronic device 101 may use a long-life battery to continue operation, or maintain memory of the electronic device 101 during periods when no power is available from the inductor 102. Typically, the long-life battery does not enable normal operation of the electronic device 101 for prolonged periods of time. Instead, the long-life battery may provide backup power to an electronic device 101 to preserve operation of the electronic device 101 or data stored in the memory during power outages.

The electronic device 101 may convert the power provided by the inductor 102 to a desired format. The inductor 102 typically provides an alternating current (AC) power to the electronic device 101. A power conversion module of the electronic device 101 may convert the AC power to a DC power with a desired voltage. The power conversion module provides the desired DC power to the other modules of the electronic device 101.

In one embodiment, the electronic device 101 comprises an infrared beacon that transmits a predetermined infrared signal. Of course the electronic device 101 could comprise substantially any electronic device 101 requiring an amount of power less than or equal to the amount of power that the inductor 102 provides. For example, the electronic device 101 could comprise a radio frequency beacon, an ultrasonic beacon, or the like.

Figure 1B:
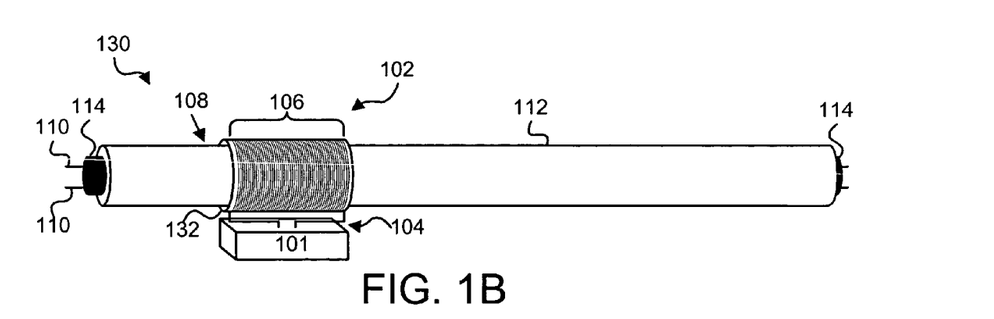
FIG. 1B is a perspective view of one embodiment of an apparatus for inducing an electrical current for use by an electronic device.

FIG. 1B illustrates another embodiment of an apparatus 130 for inducing an electrical current for use by an electronic device 101. The apparatus 130 includes an inductor 102, an interface 104, and a non-conductive tube 132. The spiral loops 106 of the inductor 102 are wound around the circumference of the non-conductive tube 132. Preferably, the spiral loops have a circular cross section. The loops may also have an oval, square, polygonal, or other cross section. The non-conductive tube 132 provides a rigid support for the windings and ensures that the inductor 102 forms a tube.

The inductor 102 may comprise flexible, fine gauge wire, wound around the non-conductive tube 132. The flexible, fine gauge wire may not hold a tube shape without the aid of the non-conductive tube 132. The use of flexible, fine gauge wire may be advantageous, since an inductor 102 with a predetermined number of loops 106 of a fine gauge wire may be shorter lengthwise than an inductor 102 using larger wire with the same number of loops 106.

When using an arc lamp tube as an insulated conductor 108, it may be desirable to make the inductor 102 as short as possible to minimize the amount of light that the inductor 102 blocks when installed on the arc lamp tube. The non-conductive tube 132 ensures that the flexible, fine gauge wire is held in a tube shape. In one embodiment, the tube shaped inductor 102 may comprise a plurality of concentric spiral tubes each having a different diameter.

Figure 1C:
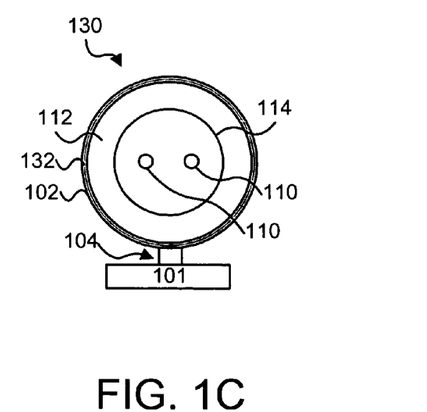
FIG. 1C is an end view of one embodiment of an apparatus for inducing an electrical current for use by an electronic device.
Figure 1D:
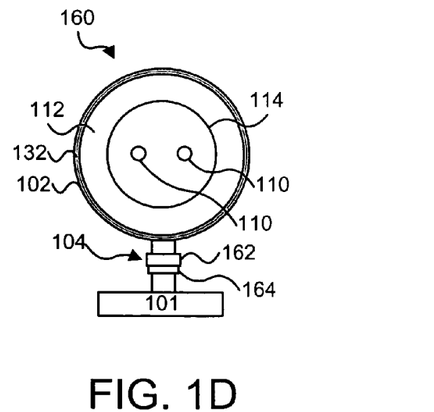
FIG. 1D is an end view of another embodiment of an apparatus for inducing an electrical current for use by an electronic device.

FIG. 1C illustrates an end view of the apparatus 130 of FIG. 1B. In this embodiment, the interface 104 comprises soldered wires. FIG. 1D illustrates an end view of another embodiment of an apparatus 160 for inducing an electrical current for use by an electronic device 101. In this embodiment, the interface 104 comprises a first connector 162. The electronic device 101 includes a second connector 164 that removably mates with the first connector 162.

Figure 2:
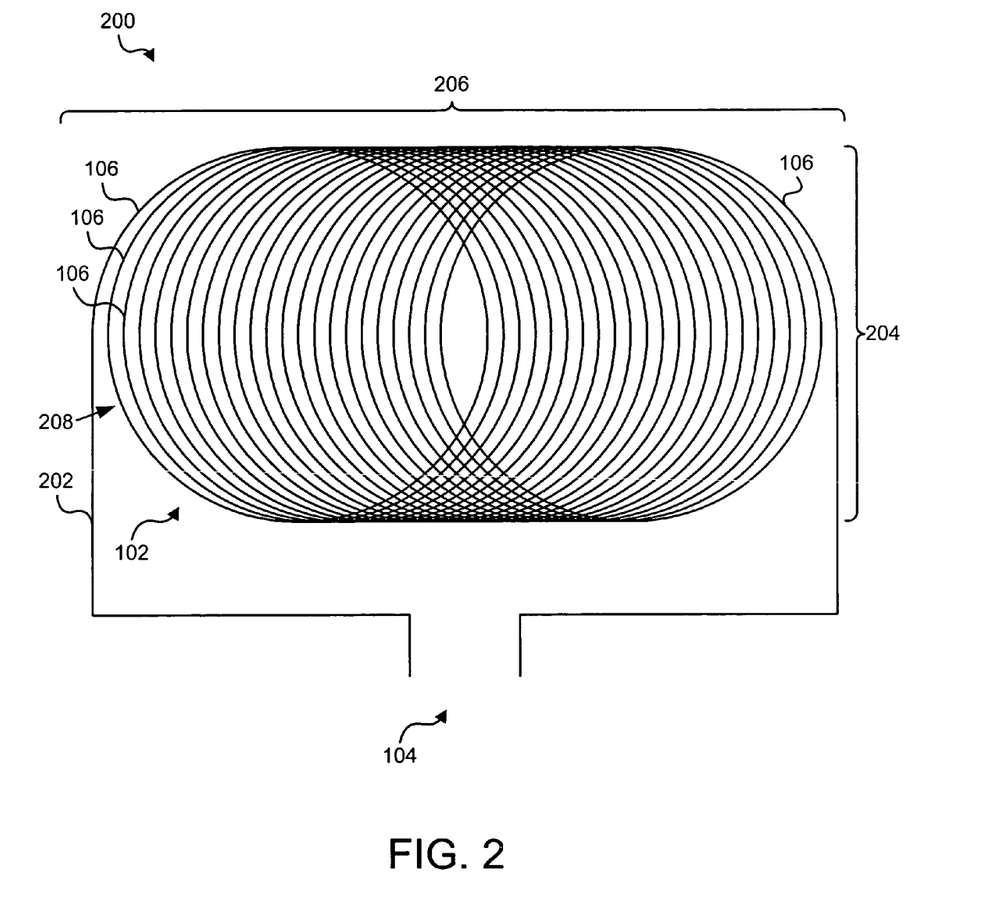
FIG. 2 is a perspective view of one embodiment of an inductor for inducing an electrical current for use by an electronic device.

FIG. 2 illustrates an apparatus 200 for inducing an electrical current for use by an electronic device 101 (See FIG. 1A). The apparatus 200 includes an inductor 102 and an interface 104. The inductor 102 comprises a continuous wire 202 looped spirally forming a tube with a predetermined diameter 204. The continuous wire 202 may comprise a single wire, or may comprise multiple wires joined together so that the resulting wire 202 is continuous. The loops 106 of the inductor 102 are arranged spirally, in a helical shape, extending laterally from one end of the inductor 102 to the other end of the inductor 102.

The amount of power that the insulated conductor 108 (See FIG. 1A) induces in the inductor 102 is proportional to the number of loops 106 of the inductor 102. The insulated conductor 108 induces additional current for each loop 106 of the inductor 102. A particular insulated conductor 108 may induce a desired power in the inductor 102 if the inductor 102 comprises a certain number of loops 106. For example, a thirty-two watt Phillips F3278/TL835 fluorescent bulb carrying an alternating current between about 0.1 amps and about 0.6 amps, with a frequency above about one kilohertz may induce a power of between about one milliwatt and about ten milliwatts in an inductor 102 comprising about one thousand loops 106 of twenty-eight gauge wire 202 arranged in a tube shape with a diameter 204 between about one-half inch and about two inches. The Phillips fluorescent bulb may be driven by an electronic ballast.

The gauge of wire 202 and the number of loops 106 determine the length 206 of the inductor 102. Using a fine gauge wire 202 for the inductor 102 may minimize the length 206 of the inductor 102. Loops 106 of a fine gauge wire 202 occupy less space than loops 106 of a larger wire 202 since the loops 106 are typically placed adjacent to each other. When using an arc lamp tube as an insulated conductor 108, it is preferable to make the inductor 102 as short lengthwise as possible to minimize the amount of light the installed inductor 102 blocks.

The inductor 102 comprises loops 106 of wire 202 arranged in a tube con shape. The void of the tube shape within the loops 106 of wire 202 is referred to herein as the bore 208 of the inductor 102. In one embodiment, if an arc lamp tube is used to induce a current in the inductor 102, the diameter 204 of the bore 208 of the inductor 102 may be between about one-half inch and about two inches. Preferably, the diameter 204 is larger than the diameter of the insulated conductor 108 that induces a current in the inductor 102.

In one embodiment, the inductor 102 may include a center tap wire coupled to one of the loops 106 of the inductor 102. Preferably, the center tap wire is coupled to a loop 106 near the center of the length of the inductor 102. The center tap wire may be connected to the interface 104 and utilized by the electronic device 101.

Figure 3:
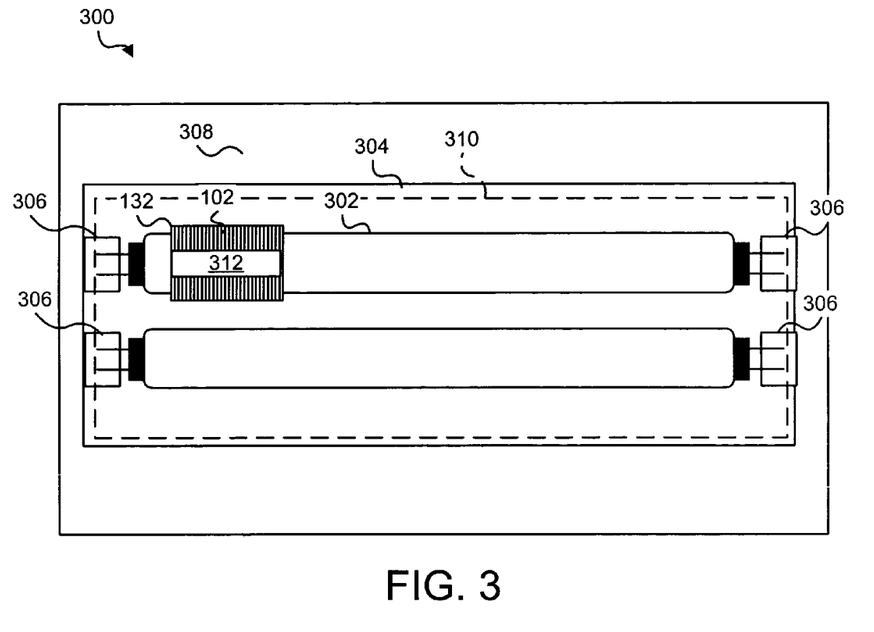
FIG. 3 is a bottom view of one embodiment of a system for inducing an electrical current for use by an electronic device.

FIG. 3 illustrates a system 300 for inducing an electrical current for use by an electronic device 101. The system 300 includes a non-conductive tube 132, an arc lamp tube 302, a light fixture 304, an inductor 102, and an interface 104 (See FIG. 1A). The light fixture 304 retains the arc lamp tube 302 and powers the arc lamp tube 302. The light fixture 304 may comprise sockets 306 that engage the arc lamp tube pins 110 (See FIG. 1A). The sockets 306 provide power to the pins 110, enabling a current to pass through the arc lamp tube 302.

The light fixture 304 may be mounted in a ceiling 308 to provide light for a room. Additionally, a translucent protective cover 310 may be installed over the arc lamp tubes 302. The translucent protective cover 310 allows light from the arc lamp tubes 302 to pass through the cover 310. The cover 310 prevents accidental breakage of the arc lamp tubes 302. The cover 310 may also diffuse light from the arc lamp tubes 302.

The inductor 102 comprises a continuous wire 202 (See FIG. 2) wound spirally around the non-conductive tube 132. The non-conductive tube 132 ensures that the wire 202 forms a tube. The inductor 102 derives power from the arc lamp tube 302. The arc lamp tube 302 is positioned within the bore 208 (See FIG. 2) of the inductor 102. The interface 104 may couple the inductor 102 to an infrared beacon 312. The power induced within the inductor 102 substantially wholly energizes the infrared beacon 312. The infrared beacon 312 transmits an infrared signal. A plurality of infrared beacons 312 may be installed on a plurality of arc lamp tubes 302 in the ceiling of a large room such as a retail store. Portable devices may receive the infrared signals and use the signals to determine the location of the portable device within the retail store.

The schematic flow chart diagram included is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
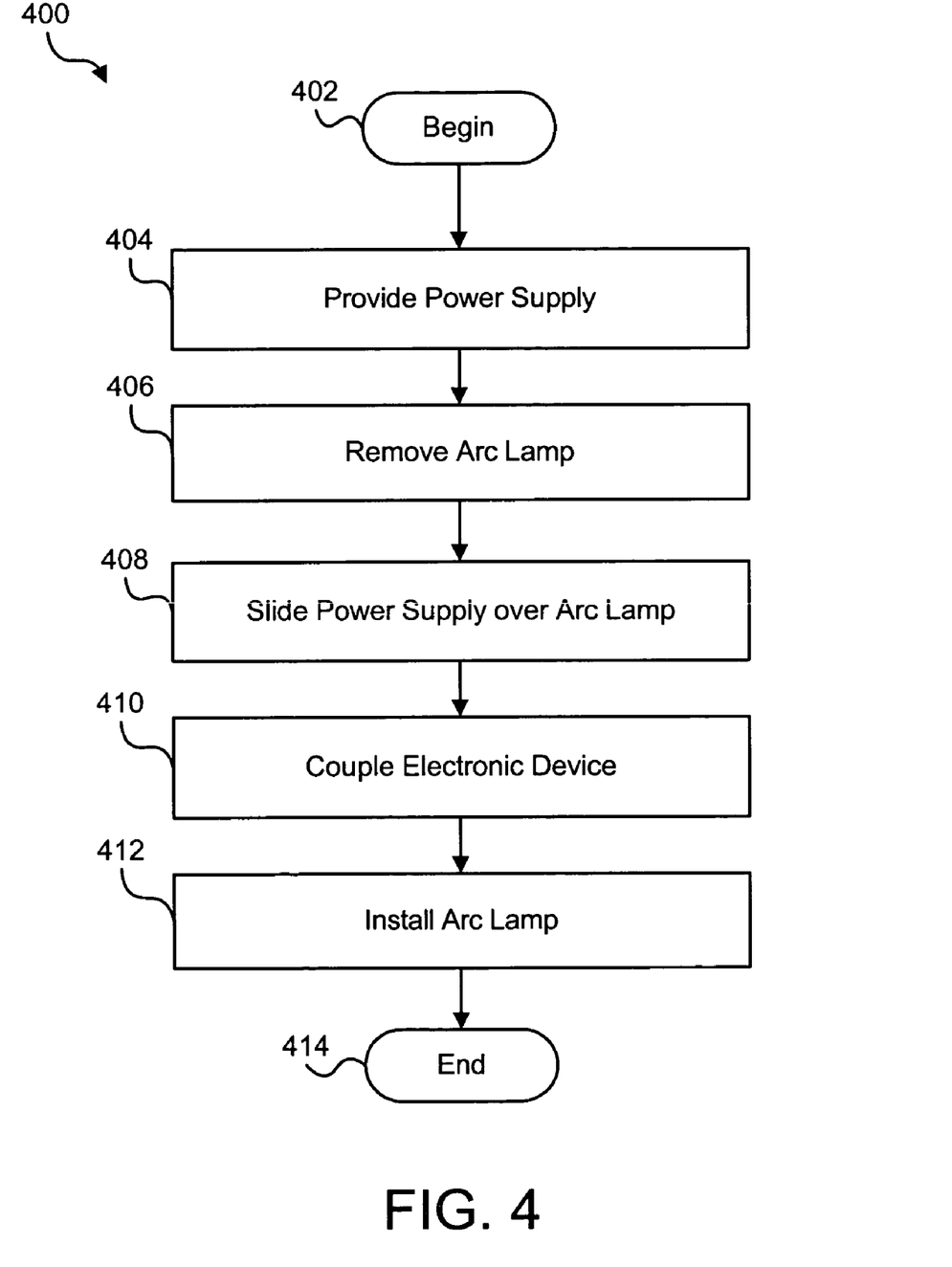
FIG. 4 is a schematic block diagram illustrating one embodiment of a method for inducing an electrical current for use by an electronic device.

FIG. 4 illustrates one embodiment of a method 400 for inducing an electrical current for use by an electronic device 101 (See FIG. 1A). The method 400 begins 402 when an installer provides 404 an inductive power supply. The power supply is substantially the same as the apparatus 100 described in relation to FIG. 1A. The power supply comprises an inductor 102 comprising a continuous wire 202 (See FIG. 2) looped spirally to form a tube, and an interface 104 (See FIG. 1A). The interface 104 couples the inductor 102 to an electronic device 101. One embodiment of the power supply includes a non-conductive tube 132 (See FIG. 1B). The spiral loops 106 of the inductor 102 are wound around the circumference of a non-conductive tube 132.

Next, the installer removes 406 an arc lamp tube 302 (See FIG. 3) from a light fixture 304. The light fixture 304 is typically installed in the ceiling of a room. The installer slides 408 the power supply over the arc lamp tube 302 such that the arc lamp tube 302 passes axially through the bore 208 (See FIG. 2) of the inductor 102. Next, the installer couples 410 the electronic device 101 to the interface 104 of the inductor 102.

Coupling may comprise soldering wires of the electronic device 101 to the interface 104, connecting a first connector 162 of the interface 104 to a second connector 164 of the electronic device 101, or other method of coupling. The installer then installs 412 the arc lamp tube 302, around which the power supply has been slid, in the light fixture 304. Installing the arc lamp tube 302 may comprise pushing the pins 110 (See FIG. 1A) of the arc lamp tube 302 into the sockets 306 of the light fixture 304. Installing may also comprise positioning the electronic device 101 so that the electronic device 101 faces the floor and is exposed to the room. The method ends 414.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for inducing an electrical current for use by an electronic device, the apparatus comprising:
   an inductor comprising a continuous wire looped spirally, the inductor deriving power from a gas-filled tube positioned within the bore of the inductor; and
   an interface coupling the inductor to an electronic device that is substantially wholly energized by the power induced within the inductor.

2. The apparatus of claim 1, wherein the spiral loops of the inductor are wound around the circumference of a non-conductive tube.

3. The apparatus of claim 1, wherein the gas-filled tube carries an alternating current.

4. The apparatus of claim 3, wherein the alternating current has a frequency above about one kilohertz.

5. The apparatus of claim 1, wherein the gas-filled tube comprises an arc lamp tube selected from the group consisting of fluorescent lamp tube, mercury vapor lamp tube, sodium lamp tube and metal halide lamp tube.

6. The apparatus of claim 1, wherein the electronic device comprises an infrared beacon configured to transmit an infrared signal.

7. The apparatus of claim 1, wherein the power derived by the inductor is between about one milliwatt and about ten milliwatts.

8. The apparatus of claim 1, wherein the diameter of the bore of the inductor is between about one-half inch and about two inches.

9. The apparatus of claim 1, wherein the gas-filled tube comprises an incandescent lamp.

10. The apparatus of claim 1, wherein the inductor deriving power from a gas-filled tube further comprises deriving power from a sustained current within the gas-filled tube.

11. An apparatus for inducing an electrical current for use by an electronic device, the apparatus comprising:
   a non-conductive tube;
   an inductor comprising a continuous wire wound spirally around the non-conductive tube, the inductor deriving power from a gas-filled tube positioned within the bore of the inductor; and
   an interface coupling the inductor to an electronic device that is substantially wholly energized by the power induced within the inductor.

12. The apparatus of claim 11, wherein the gas-filled tube comprises an arc lamp tube selected from the group consisting of fluorescent lamp tube, mercury vapor lamp tube, sodium lamp tube, and metal halide lamp tube.

13. The apparatus of claim 11, wherein the electronic device comprises an infrared beacon configured to transmit an infrared signal.

14. The apparatus of claim 11, wherein the power derived by the inductor is between about one milliwatt and about ten milliwatts.

15. The apparatus of claim 11, wherein the diameter of the bore of the inductor is between about one-half inch and about two inches.

16. The apparatus of claim 11, wherein the insulated conductor carries an alternating current.

17. The apparatus of claim 11, wherein the inductor deriving power from a gas-filled tube further comprises deriving power from a sustained current within the gas-filled tube.

18. A system for inducing an electrical current for use by an infrared beacon, the system comprising:
   a non-conductive tube;
   an arc lamp tube;
   a light fixture configured to retain the arc lamp tube and power the arc lamp tube;
   an inductor comprising a continuous wire wound spirally around the non-conductive tube, the inductor deriving power from the arc lamp tube positioned within the bore of the inductor; and
   an interface coupling the inductor to an infrared beacon that is substantially wholly energized by the power induced within the inductor.

19. The system of claim 18, wherein the wire comprises an insulated wire.

20. The system of claim 18, wherein the arc lamp tube comprises an arc lamp tube selected from the group consisting of fluorescent lamp tube, mercury vapor lamp tube, sodium lamp tube, and metal halide lamp tube.

21. The system of claim 18, wherein the infrared beacon is configured to transmit an infrared signal.

22. A method for inducing an electrical current for use by an electronic device, the method comprising:
   providing a power supply having;
      an inductor comprising a continuous wire looped spirally to form a tube, the inductor deriving power from an arc lamp tube positioned within the bore of the inductor;
      an interface coupling the inductor to an electronic device that is substantially wholly energized by the power induced within the inductor;
   removing the arc lamp tube from a fixture;
   sliding the power supply over the arc lamp tube such that the arc lamp tube passes axially through the bore of the inductor;
   coupling the electronic device to the interface; and
   installing the arc lamp tube in the fixture.

23. The method of claim 22, wherein the spiral loops of the inductor are wound around the circumference of a non-conductive tube.

24. The method of claim 22, wherein the arc lamp tube is selected from the group consisting of fluorescent lamp tube, mercury vapor lamp tube, sodium lamp tube, and metal halide lamp tube.

25. An apparatus for inducing an electrical current for use by an electronic device, the apparatus comprising:
   a means for deriving power from a gas-filled tube; and
   a means for coupling the means for deriving power to an electronic device that is substantially wholly energized by the power induced within the means for deriving power.

26. The apparatus of claim 25, wherein the means for deriving power comprises an inductor.

27. The apparatus of claim 26, wherein the inductor comprises a continuous insulated wire looped spirally to form a tube.

28. The apparatus of claim 25, wherein the gas-filled tube comprises an arc lamp tube selected from the group consisting of fluorescent lamp tube, mercury vapor lamp tube, sodium lamp tub, and metal halide lamp tube.

* * * * *

UNITED STATES PATENT AND TRADEMARK OFFICE
CERTIFICATE OF CORRECTION

PATENT NO. : 7,088,057 B2  
APPLICATION NO. : 10/939682  
DATED : August 8, 2006  
INVENTOR(S) : Robert Thomas Cato Page 1 of 1

It is certified that error appears in the above-identified patent and that said Letters Patent is hereby corrected as shown below:

Title Page, Item 57, in the  
ABSTRACT,  
Line 12, "deriving inductor" should read -- deriving power from the arc lamp tube. The arc lamp tube is positioned within the bore of the inductor --.

Column 7,  
Line 6, "tube con shape." should read -- tube shape. --.

Signed and Sealed this

Fifth Day of December, 2006

JON W. DUDAS  
*Director of the United States Patent and Trademark Office*